United States Patent [19]
Wildes et al.

[11] Patent Number: 5,187,669
[45] Date of Patent: Feb. 16, 1993

[54] PROGRAMMABLE SURFACE SENSOR FOR MACHINING ROUGH STOCK

[75] Inventors: Douglas G. Wildes, Ballston Lake; Steven R. Hayashi, Schenectady, both of N.Y.

[73] Assignee: General Electric Company, Schenectady, N.Y.

[21] Appl. No.: 553,037

[22] Filed: Jul. 16, 1990

[51] Int. Cl.5 ............................................. G06F 15/46
[52] U.S. Cl. ........................... 364/474.17; 364/474.16
[58] Field of Search ...................... 364/474.15–474.18; 318/572

[56] References Cited

U.S. PATENT DOCUMENTS

| | | | |
|---|---|---|---|
| 3,784,798 | 1/1974 | Beadle et al. | 364/474.15 |
| 4,558,311 | 12/1985 | Forssven et al. | 364/474.17 |
| 4,563,897 | 1/1986 | Moore | 364/474.17 |
| 4,574,633 | 3/1986 | Ohnuki et al. | 364/474.17 |
| 4,644,335 | 2/1987 | Wen | 364/474.17 |
| 4,709,198 | 11/1987 | Ogo et al. | 364/474.17 |
| 4,724,524 | 2/1988 | Thomas et al. | 364/474.17 |
| 4,736,625 | 4/1988 | Patterson et al. | 364/474.17 |
| 4,967,365 | 10/1990 | Hampl et al. | 364/474.15 |

Primary Examiner—Jerry Smith
Assistant Examiner—Jim Trammell
Attorney, Agent, or Firm—James Magee, Jr

[57] ABSTRACT

A Machine Tool Monitor detects significant characteristics of workpieces such as roughness, scale, metal hardness and workpiece shape and does this by monitoring vibration signals produced by the machining of parts and interpreting patterns in these signals. Information from the part program improves the performance of the detector and optimizes it for the cutting conditions called for by the machine tool control. The analog channel gain of the monitor is adjusted and parameters controlling the digital pattern recognition logic are selected using part program information on machining parameters. Efficiency is improved for example by decreasing the amount of time wasted in cutting air.

10 Claims, 7 Drawing Sheets

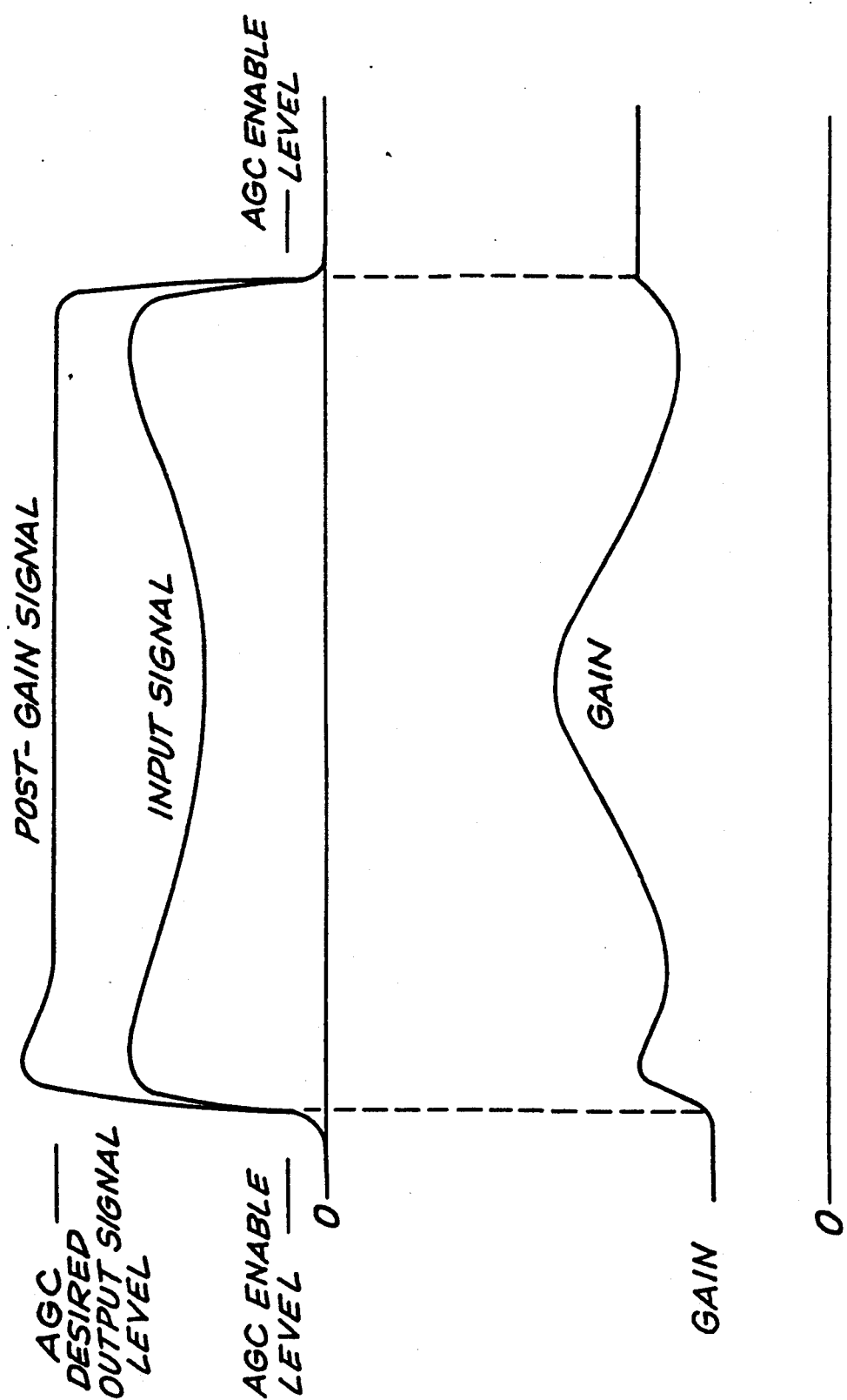

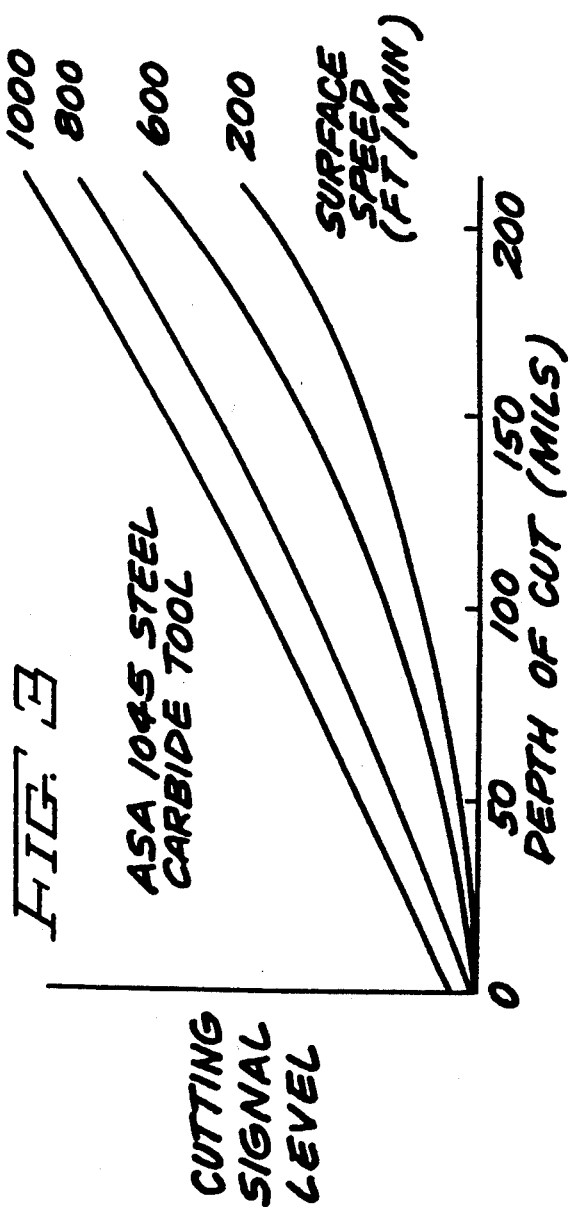

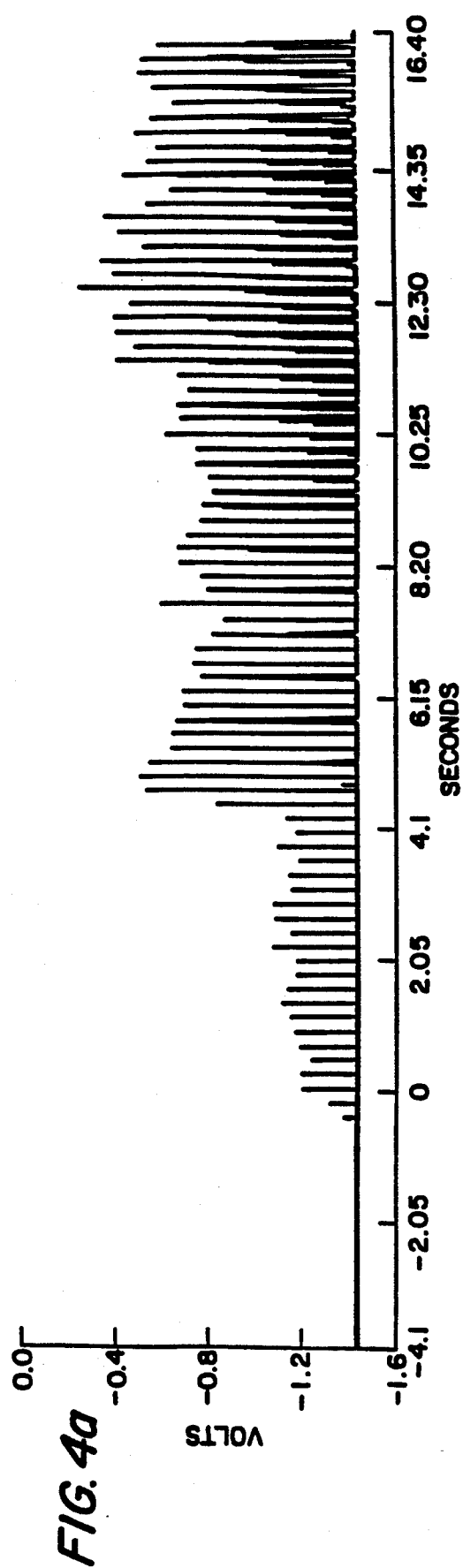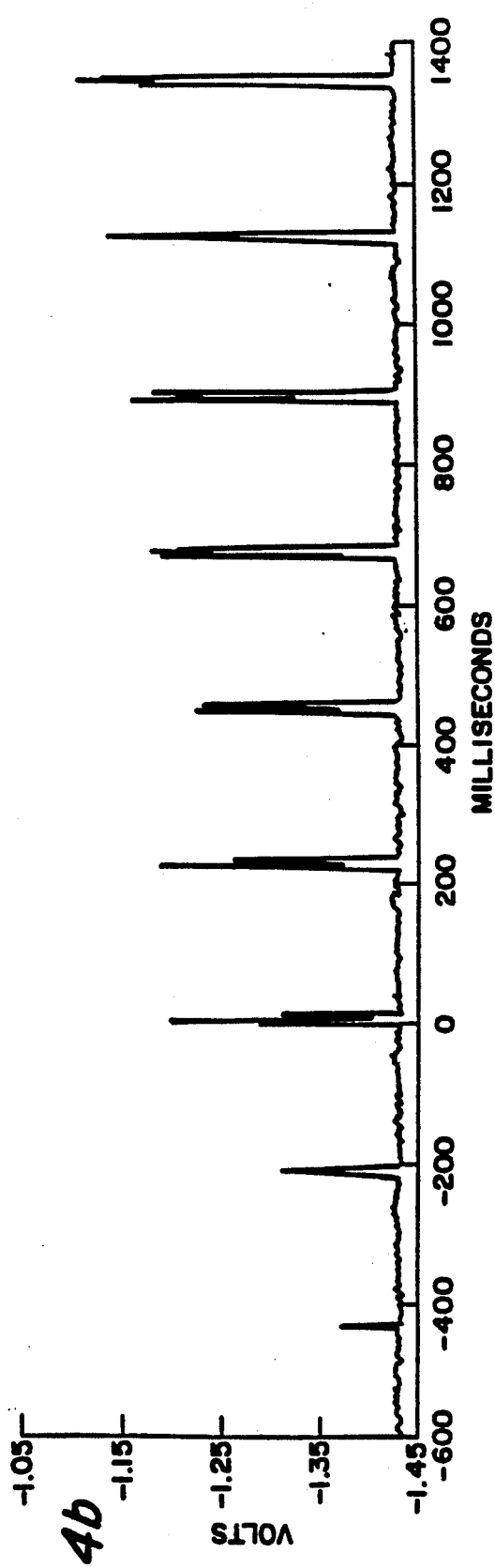

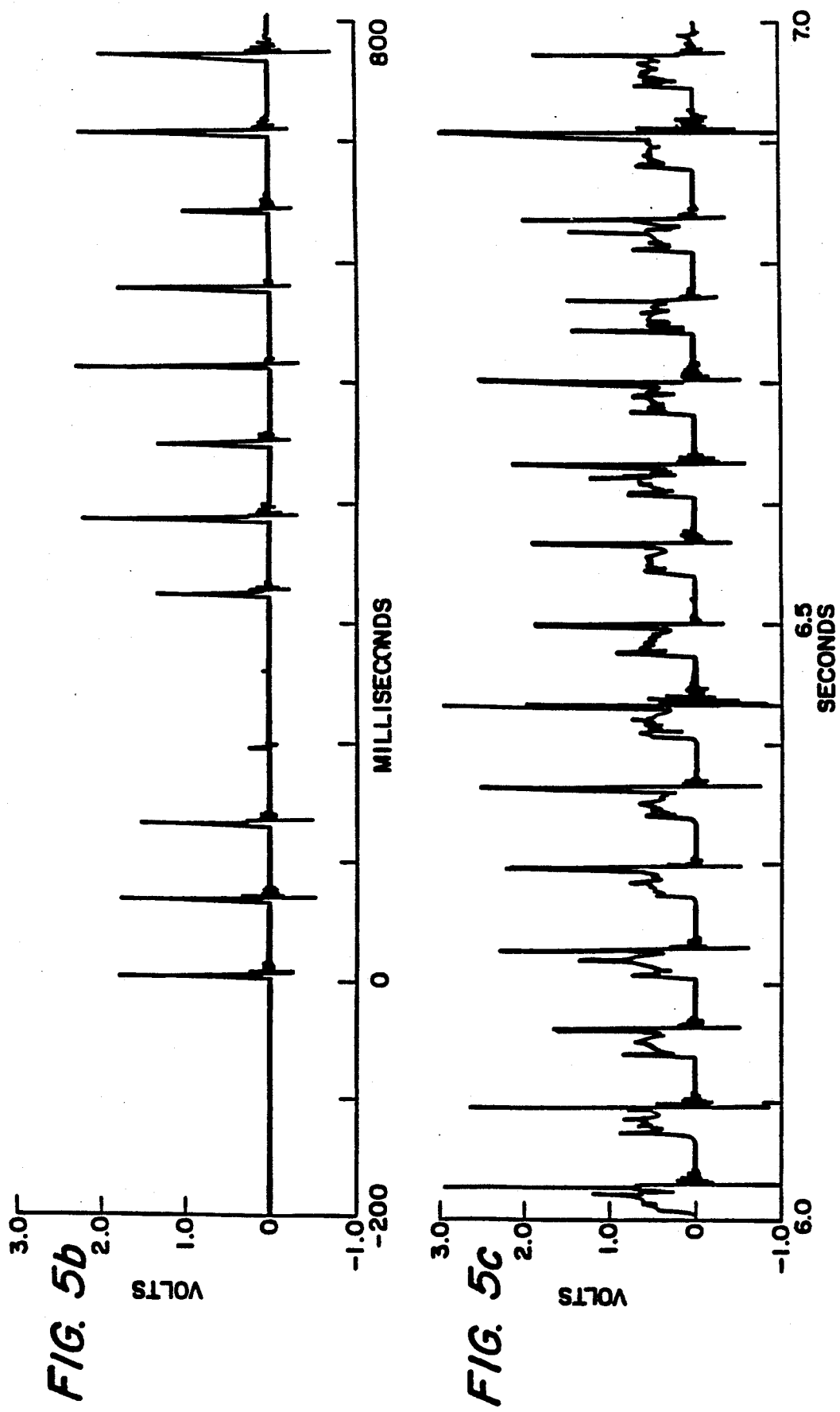

PROGRAMMABLE SURFACE SENSOR FOR MACHINING ROUGH STOCK

FIELD OF THE INVENTION

This invention relates to a system and method to continuously control the operation of a cutting tool for machining a rough stock workpiece having wide tolerances.

This invention monitors the vibration signals produced by moving contact between the cutting tool and the workpiece. By analyzing the amplitude and rate of change of these vibrations, the cutting tool is precisely and continuously controlled to machine a rough stock workpiece.

BACKGROUND OF THE INVENTION

The Machine Tool Monitor is a device which monitors vibration signals produced by the machining of metal parts and interprets patterns in these vibration signals to detect events of significance in the control of the machining process. Illustrative of such devices is that described in commonly assigned U.S. Pat. No. 4,724,524, Vibration-Sensing Tool Break and Touch Detector for Machining Conditions. This machine has two operating modes. In the tool break detection mode it detects cutting tool insert breaks; in the tool touch detection mode it detects the first contact of an advancing tool with the rotating workpiece.

After treatment of tool breakage and touch control, however, one of the greatest remaining problems in the development of such systems for controlling cutting tools for machining of rough stock workpieces is programming the allowance for wide dimensional variations. If the accepted variations are large, the cutting tool can start its operation on very rough stock, but a program which can accept rough stock having the maximum values will waste significant time "cutting air" on rough stock having the minimum values. If, however, the accepted variations are smaller in order to reduce the wasted time, tightening the tolerances on the rough stock significantly increases the cost of this stock.

Most modern machine controllers include routines for probing the outside dimensions of the rough stock. Existing probes are both expensive and delicate and are consequently frequently subject to damage when measuring the rough stock. Additionally, these probes only detect the point of initial contact with the surface of the stock to be machined and offer little or no information concerning the orientation, roughness, hardness, or variations in that surface.

Tool monitoring systems have employed an analysis of vibration signals produced by machining of metal parts to detect a tool break. However, none of these monitoring devices continuously control the operation of a cutting tool working on a workpiece. Thomas et al., in the above-mentioned U.S. Pat. No. 4,724,524, and also in U.S. 4,642,617, 4,806,914 and 4,636,780, for example, detect a waveform profile corresponding to a tool break. When the tool break is detected from a characteristic acoustic signature, this device simply stops the operation of the cutting tool. Begin, in U.S. Pat. No. 4,514,797 discloses a device that detects the increasing amplitude of the waveform produced between the cutting tool and the workpiece due to wear. However, Begin provides no teaching of any means to separate the vibrations of the cutting operations from the vibrations produced by the cutting machine itself.

As has been pointed out by Thomas et al., without particularly sensing and monitoring the vibrations due only from the cutting operation, the control of fine machining cannot take place. Mention is also made of Moore, who, in U.S. Pat. No. 4,563,897, develops a machining "signature" waveform profile of the cutting tool in moving contact on the surface of the workpiece. A deviation from a preset value of the "signature" then corresponds to wear of the cutting tool. Moore's disclosure thus does not allow for wide variations in surface hardness and accepting wide tolerances of workpiece.

None of these patents teach or disclose actually controlling the cutting operation. Thus, no system exists for continuously controlling the machining of a workpiece which has wide dimensional tolerance.

SUMMARY OF THE INVENTION

An object of the invention is the use of programmed information to set parameters controlling the workpiece surface detection logic and optimize them for the cutting conditions specified by the machine tool control.

Another object of the invention is to provide a system for continuously controlling the operation of a cutting tool fine machining a rough stock workpiece of wide tolerances.

Another object is to control this operation efficiently by continuously controlling the cutting to avoid wasting time "cutting air".

Yet another object is to detect and separate the vibration caused by moving contact between the cutting tool and the workpiece from the vibration caused by the cutting tool alone to produce a series of digital values corresponding to a rectified amplified vibration signal of the cutting operation to analyze the amplitude and the deviation and the rate of change of the digital values for comparing with preset programmed parameters for optimizing the machining time and for controlling the cutting operation.

According to the present invention, there is provided an improved controller comprised of a vibration sensor to generate a signal corresponding to vibrations at the cutting tool/workpiece interface, and an analog signal processing channel having a gain control and means to filter the vibration signal to attenuate lower frequency machinery noise and detect the signal energy in a restricted acoustic frequency band below 100 KHz. A digital subsystem includes means for sampling and converting analog samples of the analog channel output to digital values. Means are provided for adjusting the analog channel gain control to optimize operation of the monitor for varying machining conditions. In one embodiment, the gain is calculated in the monitor from machining parameters such as surface speed, depth of cut, feed rate, and workpiece and tool description that are communicated from the machine tool control. In an alternative embodiment, the machine tool control information transferred to the monitor is precalculated gain values which are derived from these machining parameters and are routed to the gain control. In yet another embodiment, the gain is determined by the action of an adaptive automatic gain control.

Successful development of the system and method of this invention resides in the recognition that contact between a tool and the high points of a very rough surface produces impulsive signals, with a duration comparable to the rise and fall time of the signal itself. Also, contact between a tool and a smooth surface, where the surface orientation and the direction of relative motion is such that the extent of contact is constant, produces a uniform signal level which rises rapidly at the moment of initial contact and then persists with minimal change. It is also observed that contact with a surface whose tangent is not substantially parallel to the path of relative motion produces a modulated signal with the amplitude varying directly with the depth of contact.

Furthermore, it has been discovered that the signal amplitude will also vary directly with the hardness of the material, and this information may therefore be used to differentiate between bare metal surfaces and surfaces covered with rough scale.

BRIEF DESCRIPTION OF THE DRAWINGS

FIG. 2b depicts the action of an adaptive automatic gain control.

FIG. 3 is a graph of cutting signal level versus depth of cut and surface, speed.

FIG. 4a depicts a signal produced while face milling rough steel stock.

FIG. 4b shows an expanded view of the initial portion of the cut made in FIG. 4a.

FIG. 5b depicts the first contact with the fine points of the hexagon shown in FIG. 5a.

FIG. 5c shows the increase of the amplitude and duration of the signal as the depth of the cut increases in the hexagonal steel bar stock of FIG. 5a.

DETAILED DESCRIPTION OF THE INVENTION

The Machine Tool Monitor, when used to machine rough surfaced parts, can automatically select the mode of operation so that even in unmanned operations each cut in the part program of cuts to be made on a workpiece can be monitored for aircutting time, part shape, surface scale, metal hardness, and the like. In addition, the Machine Tool Monitor can supply such information directly to the machine tool control, which can be programmed to make the proper response to the detected event without human intervention. Finally, information from the part program in the machine tool control may be used to optimize the Machine Tool Monitor parameters for the machining conditions to be expected on each individual cut.

Figure 1:
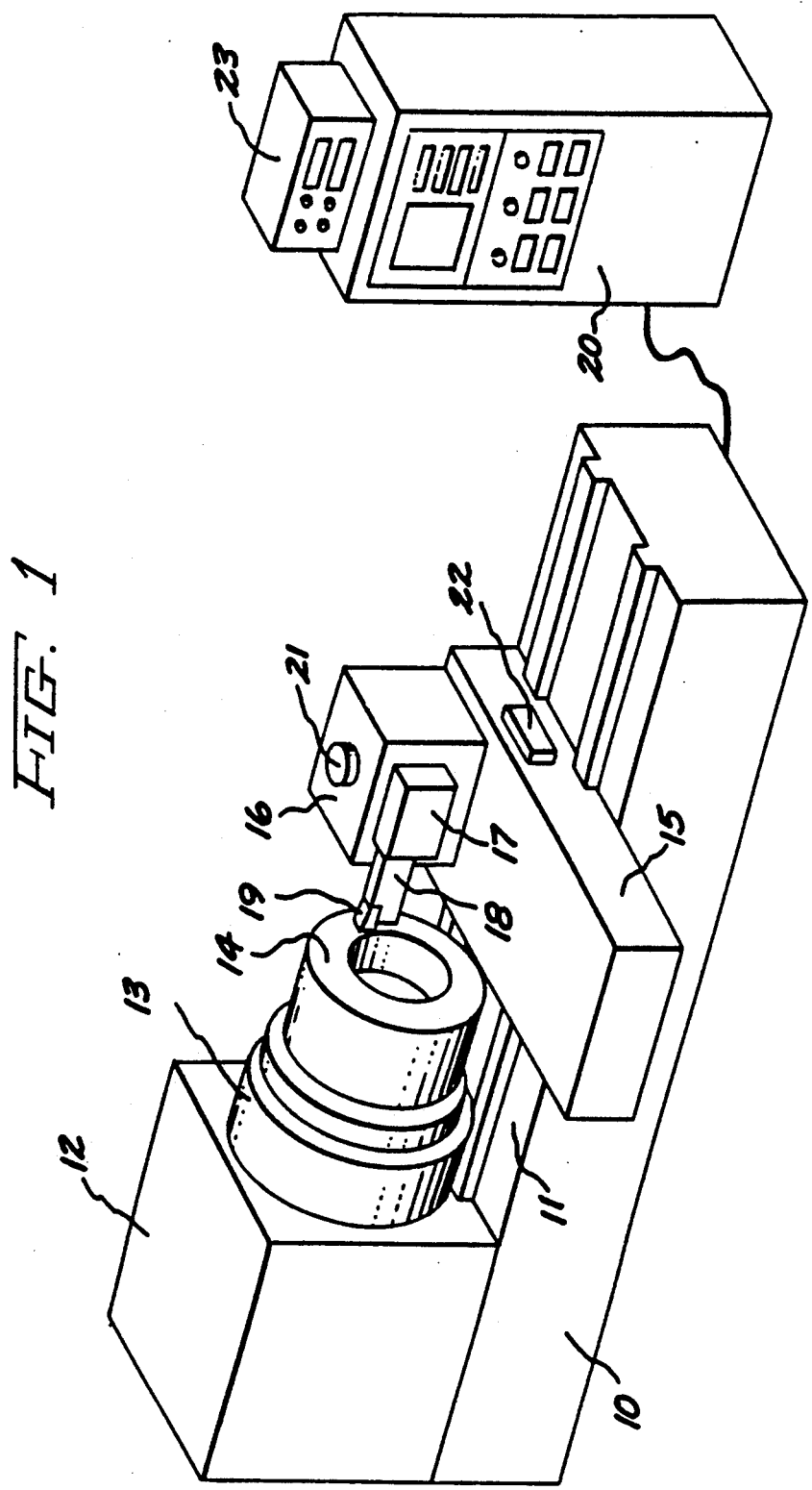
FIG. 1 is a schematic perspective view of a horizontal turret lathe equipped with a Machine Tool Monitor to continuously control the machining of a workpiece which has wide dimensional tolerances.

FIG. 1 shows a horizontal turret lathe on which is installed an improved Machine Tool Monitor. The monitor has applicability to vertical turret lathes and other types of machine tools, such as milling machines, machining centers, and drills. The illustrated lathe components are the machine frame 10, Z slide 11, headstock 12, chuck 13, workpiece 14, and X cross slide 15. A rotatable tool turret 16 has several tool blocks 17 (only one is shown) each supporting a tool holder 18 and cutting insert 19. The machine tool control 20 is also called a numerical control or computerized numerical control. The major components of the Machine Tool Monitor are: a vibration sensor 21, such as a broadband accelerometer mounted on the lathe turret or turret base in a location with good coupling to vibrations generated at the tool/workpiece interface; and an amplifier and filter 22 employed to reject the low frequency vibrations due to spindle rotation and axis motion by the machine tool. The filtered signal is rectified and its envelope is sampled by an analog to digital converter. The resulting sequence of digital values is analyzeed in real time by a remotely located digital microprocessor 23.

The Machine Tool Monitor uses a single sensor that is small and rugged and may be mounted a reasonable distance from the tool/workpiece interface. One suitable vibration sensor is the VM 1000 accelerometer (Vibra-Metrics, Inc., Hamden, Conn.), used in a region of relatively sensitive response near its resonant frequency. When installed on a lathe, it is usually located on the rotatable turret and a miniature slip ring and coaxial wire connect it to the analog preprocessor. An alternative location, which depends upon the lathe design, is off the turret where no rotating coupler is required When it is installed on a milling or drilling machine, the vibration sensor might be mounted on the part, part fixture or other structure in good contact, but not necessarily direct contact, with the part. It has been established in the previously mentioned Thomas et al. patents that useful detectors utilize acoustic vibrations in the 30 to 100 KHz region; there is a need to attenuate high amplitude machinery noise which tends to be concentrated at lower frequencies, and vibrations above 100 KHz are strongly attenuated if the sensor is not on the tool holder or workpiece.

Figure 2A:
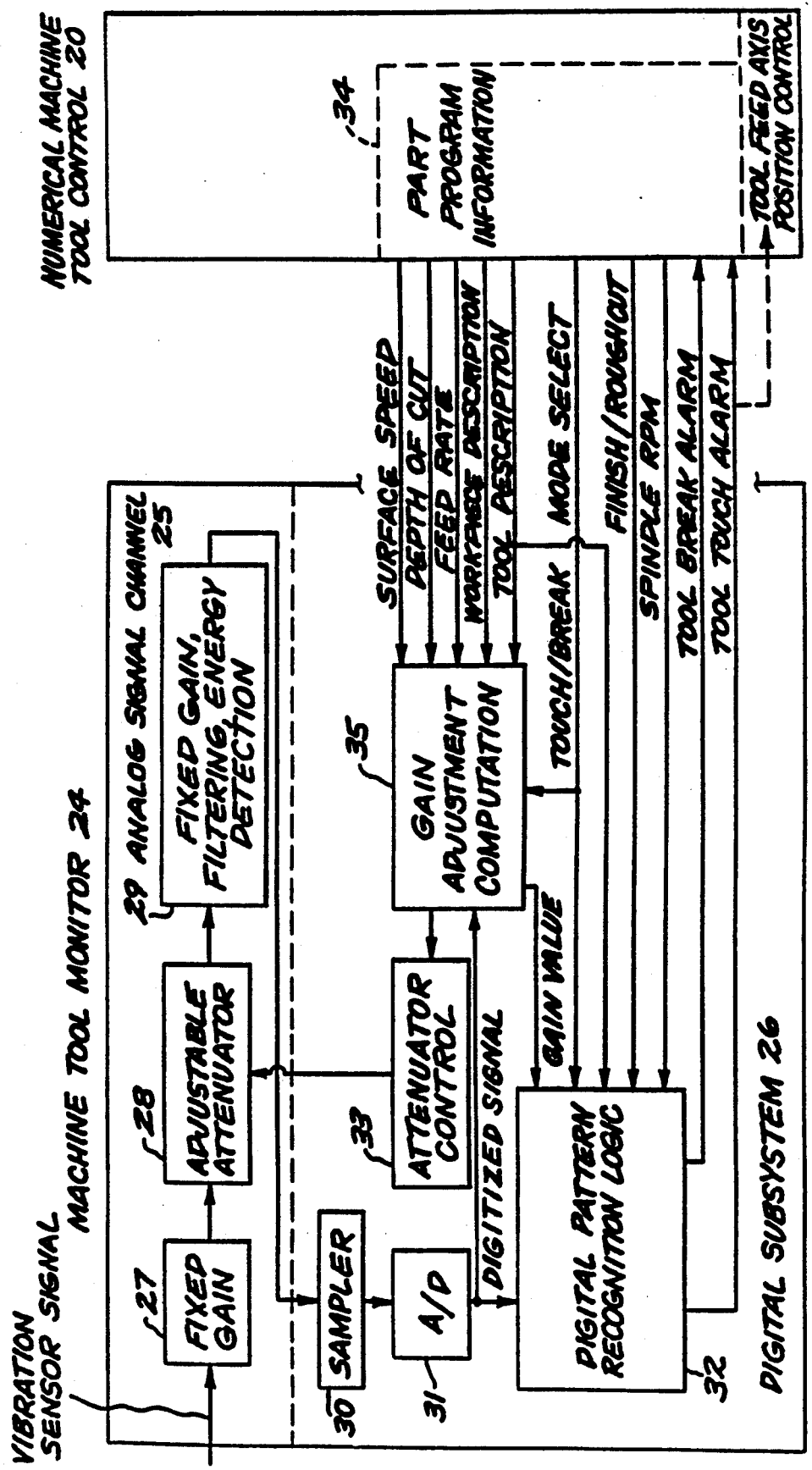
FIG. 2a shows a system for optimizing Machine Tool Monitor parameters based upon part program information.

One embodiment of the invention is illustrated in FIG. 2a, which shows the Machine Tool Monitor 24 on the left, the numerical machine tool control 20 (such as General Electric's MC2000) on the right, and the communication lines between these two devices. The Machine Tool Monitor has an analog signal channel 25 and a digital subsystem 26. The analog signal channel 25 processes the raw vibration signal output of the vibration sensor and produces an output signal amplitude versus time waveform proportional to the energy in a restricted band of the raw vibration signal. In order to provide a means for keeping the vibration signal level in the preferred operating range the analog signal channel includes a gain control capable of changing the gain of the channel over a large range under the control of the digital subsystem. As shown in the figure, the sensor has associated with it a fixed gain 27. The amplified sensor signal is presented to an adjustable attenuator or gain control 28 to keep signals within the dynamic range of the system. Thereafter the analog signal is passed to filtering and energy detection circuitry 29 (there is a fixed gain associated with the filtering). If the VM1000 accelerometer is the sensor, the analog signal processing channel can include a bandpass filter to restrict the signal to a 35 KHz to 60 KHz region, and the energy detector is comprised of a full wave rectifier and a 500 Hz low pass anti-aliasing filter to produce the signal energy versus time analog waveform. Other accelerometers and analog signal processing arrangements are described in the above-mentioned patents.

The digital subsystem 26 has a sampler 30 and analog-to-digital converter 31 to sample the analog channel output and convert analog samples to digital format. It may include digital pattern recognition logic 32 to detect specific signal patterns.

A fundamental problem with vibration monitoring systems is the large dynamic range of possible signal amplitudes with which such systems must be, and the limits on the dynamic range of electronic systems. In this case of the Machine Tool Monitor, its performance is best if the mean vibration signal level under metal cutting conditions is approximately 20 dB below the upper limit of the dynamic range of the electronics. Performance tends to deteriorate for either much higher, or much lower, signal levels. Thus, to keep the vibration signal level in the preferred operating region, analog signal channel 25 has a gain control comprised of adjustable attenuator 28 and attenuator control 33, capable of changing the gain of the channel over the range of 60 dB under the control of digital subsystem 26. A specific gain control is a multiplying digital-to-analog converter plus a counter; the attenuation control word is read out of the counter in parallel and determines the MDAC attenuation.

The signal level received from vibration sensor 21, and hence the optimum setting of the analog channel gain, depends upon a combination of factors, including the sensitivity of the sensor, the propagation loss between the vibration source (near the tool/workpiece interface) and the sensor, the type of tool, the workpiece material, the workpiece or tool surface speed, the depth of cut, and the tool feed rate. Even with a specific sensor mounted in a specific location relative to the vibration signal source, the remaining factors can cause the signal to vary over a range of more than 40 dB in conventional machining operations. Consequently, it may be necessary to adjust the analog channel gain when major changes in any of the other listed machining operation factors are made.

In FIG. 2a, the part program is indicated at 34 and part program information that resides in the machine tool control is shown. The part program is a software program which directs the computer in the machine tool control, which, in turn, controls the spindle and tool feed drives to obtain the desired depth of cut, surface speed and feed rate and controls selection of the tool with which the machining is accomplished. The part program also controls part gauging and tool offset measuring cycles in addition to the cutting operations. Consequently, the information which can predetermine the best setting of the gain of analog signal channel 25 usually resides (and most of it must reside) in the part program 34 in machine tool control 20. In one embodiment, this machining parameter information is communicated to Machine Tool Monitor 24, which uses it to compute the best setting of the analog channel gain.

The quantitative effects of the various machining parameters on the vibration signal level are known from extensive laboratory experiments that produced data such as that shown in FIG. 3. The effect of depth of cut and surface speed on cutting signal level is depicted for one combination of tool type, workpiece material and feed rate. Experiments have shown that such information permits computation of the optimum gain of analog signal channel 25 within a few dB before each cut in the part program begins Digital subsystem 26, FIG. 2a, according to this embodiment includes gain adjustment computation means 35 to which the following machining parameters are transferred from part program 34; surface speed, depth of cut, feed rate, and workpiece and tool description. The calculated gain value at each cut, determined by either a table lookup procedure or solution of a simple mathematical formula, is sent to the attenuator control 33 which in turn determines the setting of adjustable attenuator 28.

In another embodiment, the gain values for specific machining conditions are calculated outside of the monitor, by the part program post processor for example, and explicit gain values are transferred from the part program 34 to the monitor 35 and 33.

In yet another embodiment, the gain adjustment computation at 35 can contain adaptive automatic gain control logic (AGC). The digitized signal is examined by the AGC which determines a gain command for the attenuator control 33 to hold the analog signal channel output at a chosen average level, with a time constant long enough that will prevent the AGC from tracking rapid signal changes, such as those found at the end of cutting. The AGC does not try to adjust the gain during these fast signal level drops, which cause the signal level to decrease below the AGC enable level before the slow automatic gain control can increase the channel gain. Once the signal gets below the AGC enable level, the AGC no longer adjusts gain. If cutting begins again, the signal climbs above the AGC enable level and the AGC once again adjusts gain. Gain remains fixed at the last adjusted value during periods of non-cutting. FIG. 2b illustrates the behavior of the input signal, the post-gain digitized signal, and the gain during a typical cut. The AGC enable level and the AGC time constant are parameters that can be computed by the gain adjustment logic in 35 based on machining condition information communicated by the machine controller. The AGC enable level and the AGC time constant could instead be calculated elsewhere and communicated directly from the machine controller to the AGC logic.

The digital circuitry in the digital processor is typically in the form of a programmable general purpose computer.

Common signals normal to cutting are shown in FIGS. 4a, 4b and 5a, 5b, and 5c. Such signals are produced during rough surface cutting, characterized by alternate metal-cutting and air-cutting. Desirably, air cutting is reduced by the system to zero, making the ratio of metal-cutting to air-cutting substantially infinity.

For example, a signal acquired while face milling rough steel stock is shown in FIG. 4a, with an expanded view of the initial portion of the cut shown in FIG. 4b. The amplitude of the signal increases with the depth of contact. The duration of the impulsive signals increases as the tool more fully engages the part and cuts not only the peaks of the scale, but significant quantities of metal as well.

Figure 5A:
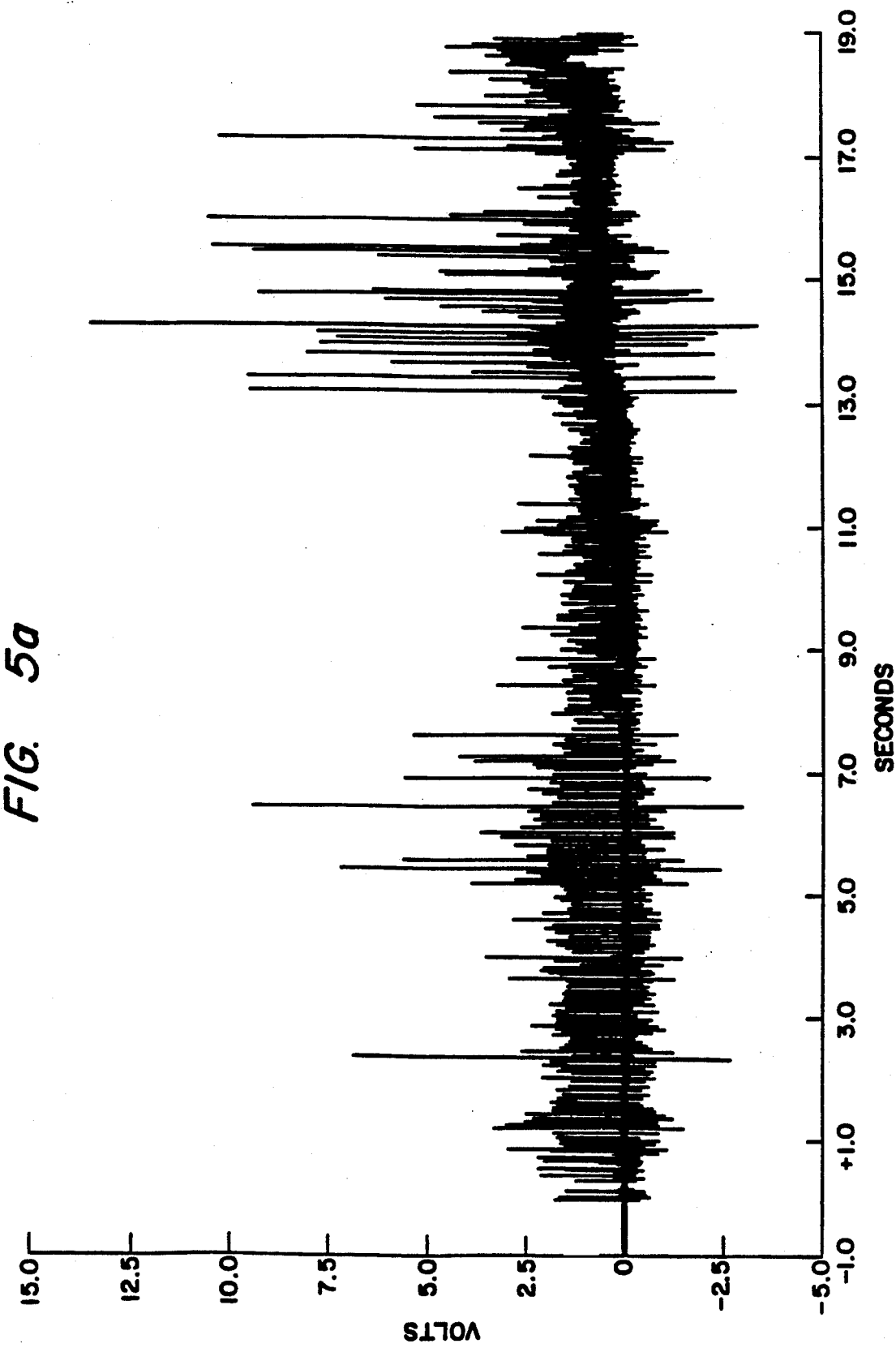
FIG. 5a is a measurement made while cutting hexagonal steel bar stock.

A graphical representation of signals made while turning hexagonal steel bar stock is shown in FIG. 5a. As the tool is plunged toward the stock, it makes first contact with the points of the hexagon (FIG. 5b). At greater depths (FIG. 5c), the amplitude and duration of the signal increase. Finally (FIG. 5a time > 13 sec.), the surface roughness is cut away and a continuous signal indicative of metal-cutting only and no air-cutting is obtained.

The digital pattern recognition logic tests the instantaneous and average signal level, and the rate and extent of any rise or fall in that level. Parameters may be set to detect any contact between tool and stock (any significant rise in signal), or only contacts of a specified minimum depth and duration. In the latter mode, the system will ignore the peaks of a rough surface (or burrs on a previously machined surface) and alert the machine controller only when a significant amount of stock has been detected.

The above-mentioned patents are incorporated herein by reference. While the invention has been particularly shown and described with reference to preferred embodiments, it would be understood by those skilled in the art that the foregoing and other changes in form and details may be made therein without departing from the spirit and scope of the invention.

We claim:

1. A system for continuously controlling the operation of a cutting tool during machining of a rough stock workpiece of wide tolerances comprising:
   a) a sensing and amplifying means for detecting a first and a second vibration signal, rejecting said first vibration signal and amplifying said second vibration signal, wherein said first vibration signal is produced by the operation of the cutting tool and said second vibration signal is produced by moving contact between the cutting tool and the workpiece;
   b) a rectifying and sampling means for rectifying said amplified signal and for producing a series of digital values corresponding to said rectified amplified signal;
   c) an analyzing and programming means for analyzing the amplitude and the duration and the rate of change of said digital values, for comparing with preset programmed parameters for optimizing machining time; and
   d) a controlling means for receiving an output from said analyzing and programming means for continuously controlling the operation of the cutting tool on the workpiece such that the rate of cutting is adapted to increase without overloading the tool until the ratio of metal cutting time to air-cutting time becomes infinity at which point the rate of cutting is adapted to decrease into a normal operating range, and wherein said analyzing and programming means compares the time spent cutting metal and time spent cutting air.

2. The system of claim 1 wherein said sensing means comprises a piezoelectric accelerometer.

3. The system of claim 2 wherein said rectifying and sampling means comprises an analog to digital converter.

4. The system of claim 3 wherein said analyzing and programming means comprises a microprocessor.

5. The system of claim 4 wherein said preset program parameters correspond to any contact between the cutting tool and the workpiece.

6. The system of claim 5 wherein said preset program parameters correspond to substantial contact between the cutting tool and the workpiece.

7. A method of continuously controlling a cutting tool machining a rough stock workpiece of wide tolerances comprising the following steps:
   a) sensing a first vibration signal produced by the operation of the cutting tool, a second vibration signal produced by moving contact between the cutting tool and the workpiece, rejecting said first vibration signal and amplifying said second vibration signal by a sensing and amplifying means;
   b) rectifying said amplified signal and producing a series of digital values corresponding to said rectified amplified signal by a rectifying and sampling means;
   c) determining the amplitude, the duration, and the rate of change of said digital values and comparing said values with preset programmed parameters by an analyzing and programming means; and
   d) using the output to control the rate of cutting of the cutting tool by control means where the rate of cutting is increased without overloading the tool until the ratio of metal-cutting to air cutting becomes infinity at which point the rate of cutting is decreased into a normal operating range, and
   wherein said producing a series of digital values includes the substep of sampling said amplified signal at times independent of the level of said amplified signal.

8. A system for continuously controlling the operation of a cutting tool during machining of a rough stock workpiece of wide tolerances comprising:
   a) a sensing and amplifying means for detecting a first and a second vibration signal, rejecting said first vibration signal and amplifying said second vibration signal, wherein said first vibration signal is produced by the operation of the cutting tool and said second vibration signal is produced by moving contact between the cutting tool and the workpiece;
   b) a rectifying and sampling means for rectifying said amplified signal and for producing a series of digital values corresponding to said rectified amplified signal;
   c) an analyzing and programming means for analyzing the amplitude and the duration and the rate of change of said digital values, for comparing with preset programmed parameters for optimizing machining time; and
   d) a controlling means for receiving an output from said analyzing and programming means for continuously controlling the operation of the cutting tool on the workpiece wherein, upon initial cutting of rough stock, the rate of cutting will increase without overloading the tool during a period of alternating intervals of air-cutting time and metal-cutting time until intervals of air-cutting time no longer occur at which point the rate of cutting decreases into a normal operating range, and wherein said rectifying and sampling means samples said amplified signal at times independent of the level of said amplified signal, and wherein said analyzing and programming means compares the time spent cutting metal and time spent cutting air.

9. The system of claim 1 said sensing and amplifying means includes a filter allowing passage only of signals from 35 kHz to 60 kHz.

10. The system of claim 1 wherein said analyzing and programming means analyzes the average level of said digital values.

* * * * *